United States Patent [19]

Bryant

[11] 4,235,077
[45] Nov. 25, 1980

[54] COMBINATION ENGINE

[76] Inventor: Clyde C. Bryant, 1920 Forrest Ave., East Point, Ga. 30344

[21] Appl. No.: 955,898

[22] Filed: Oct. 30, 1978

[51] Int. Cl.³ ............... F01K 23/10; F01K 23/14
[52] U.S. Cl. ................... 60/618; 123/198 F
[58] Field of Search ............... 60/616, 618; 123/198 F

[56] References Cited

U.S. PATENT DOCUMENTS

| | | | |
|---|---|---|---|
| 3,350,876 | 11/1967 | Johnson | 60/618 |
| 4,007,594 | 2/1977 | Elsea | 60/618 |
| 4,087,974 | 5/1978 | Vaughan | 60/618 |
| 4,114,588 | 9/1978 | Jordan | 123/198F |

FOREIGN PATENT DOCUMENTS

| | | | |
|---|---|---|---|
| 447293 | 4/1949 | Italy | 60/618 |
| 380315 | 9/1932 | United Kingdom | 60/618 |

*Primary Examiner*—Michael Koczo

[57] ABSTRACT

A combination engine with an internal combustion engine section and a vapor engine section in which the heat generated by the internal combustion section is transferred to a liquid coolant circulating therein converting the coolant into vapor which is then superheated by the internal combustion exhaust and used to power the vapor engine section.

6 Claims, 9 Drawing Figures

COMBINATION ENGINE

BACKGROUND OF THE INVENTION

Internal combustion engines have a very low efficiency rate in converting fuel to kinetic energy. A large percentage of the energy of the burned fuel is converted into heat which has to be dissipated by a cooling system or is expelled into the air by the exhaust line.

One method that has been tried to improve the efficiency of internal combustion engines is to have the power stroke of the piston alternately powered by fuel and steam. While these engines would theoretically have higher efficiency rates, a number of difficulties are encountered in using the same piston and cylinders for both fuel and steam strokes as a different design is needed for each. It is an object of this invention to develop an engine in which the heat generated by the internal combustion section is converted into vapor for powering a vapor powered engine section.

It is also an object of this invention to develop an engine that has a greater efficiency in converting fuel to kinetic energy. It is a corollary object to develop an engine that uses less fuel per unit of kinetic energy developed.

SUMMARY OF THE INVENTION

A conventional internal combustion engine is combined with a Rankine cycle engine. This combination engine is surrounded by an insulated jacket to prevent the loss of heat generated by the ignition in the cylinders and friction of moving parts in the internal combustion section of the engine. This heat is transferred to a coolant (which is also a working fluid), such as water or an organic fluid, circulating around the engine block of the internal combustion section. This working fluid is converted to vapor and transported to a boiler through which exhaust gases pass. The exhaust gases superheat the vapor which is used to run the Rankine cycle of the combination engine. In order to increase fuel economy, the engine may have a solenoid or manually actuated device to close the valves on one or more cylinders of the internal combustion section. When the valves to a cylinder are closed, no fuel air mixture reaches that cylinder. The operation of the internal combustion section and Rankine cycle section can be controlled by an electronic module.

DESCRIPTION OF THE DRAWINGS

FIG. 6 is a close-up view of a valve mechanism of the valves in the normal operating position.

FIG. 7 is a close-up view of a valve mechanism with the valves in the sealed position.

FIG. 8 is an exploded view of the components of the valve shut-down mechanism.

FIG. 9 is a cross sectional view of an auxiliary boiler for attachment to a combination engine.

Figure 1:
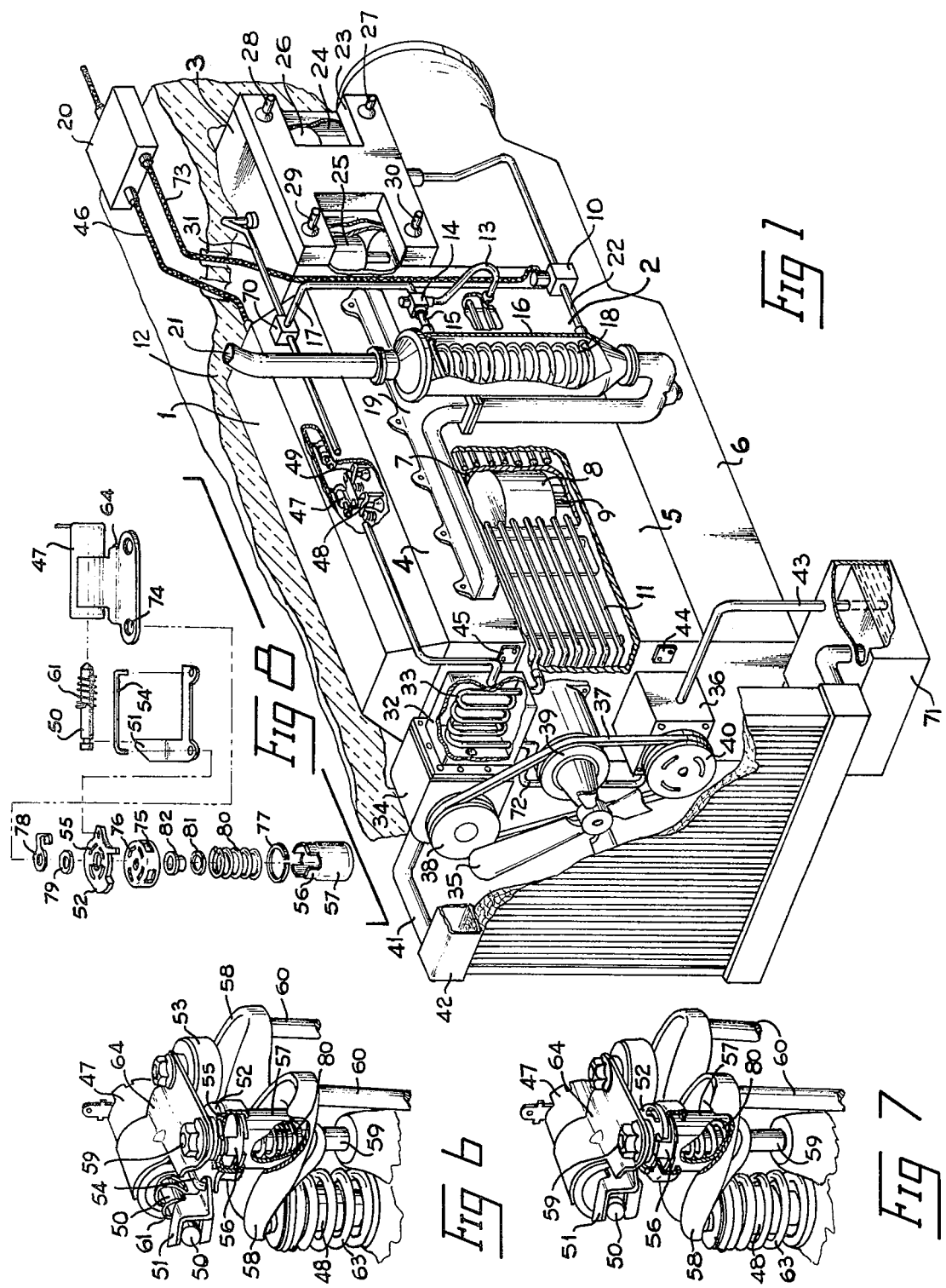
FIG. 1 is a perspective view of the side of a combination internal combustion and two cylinder Rankine cycle engine.

The preferred type of combination engine is designated by 1 in FIG. 1. This engine consists of an in-line reciprocating diesel internal combutaion section 2 and a Rankine cycle section 3. The internal combustion section 2 is of conventional design and construction except as otherwise indicated. It consists of a head 4, a cylinder block 5, and oil pan 6. Each cylinder 7, piston 8, and connecting rod 9 is of a conventional design. Boiler tubing 11 is contained within the cooling ducts of the cylinder block 5 adjacent to the cylinders 7. The ducts containing the boiler tubing are connected to ducts within the cylinder block as necessary to maintain uniform engine temperature. Heat transfer fluid may be circulated by a pump (not shown) throughout the ducts in the block 5.

The entire engine 1 is surrounded by an insulated jacket 12, which may be an asbestos composition, to prevent the escape of heat from the engine. Other suitable insulating material may also be used. The heat that is radiated through the walls of the cylinder 7 when ignition occurs is transferred to the heat transfer fluid and then to the coolant in the boiler tubing 11. The coolant can be any fluid that is satisfactory for operating a Rankine cycle engine. Among these fluids are water, and various organic fluids such as Freon and a combination of trifluroethanol and water. The fluid in the boiler tubing 11 cools the internal combustion section to prevent overheating and in the process is converted to vapor at normal operating temperatures. The conversion to vapor is at a slightly higher temperature when the working fluid is water rather than an organic fluid. The boiler tubing 11 serves as a preheating boiler for the Rankine cycle section. The fluid in the boiler tubing 11 is heated to a temperature of 200° F. to 230° F., when an organic fluid is used and from 328° F. to 400° F. when water is used.

After being heated by the engine, the vapor is conducted from the boiler tubing 11 to an exit tube 13 which passes to a thermostatic pressure relief valve 14. If the vapor that enters the valve is within the desirable range, the valve 14 allows the vapor to be conducted by an interconnecting tube 15 into an exhaust manifold boiler 16. If the engine temperature should be excessive, the thermostat will open the valve and allow a portion of the vapor to be conducted to the return tube 31 via tube 17. A one-way valve 70 permits the vapor to enter the return tube 31 but prevents vapor in the return tube 31 entering the boiler coil tubes 18. Alternatively, valve 14 could be pressure controlled to prevent excessive pressure and temperature build-up. The vapor is superheated in the boiler tubing 18 by the engine exhaust gases which leave the internal combustion section through an exhaust manifold 19. The exhaust then passes through the manifold boiler 16 superheating the vapor in the boiler tubing 18. The exhaust is vented to the atmosphere through a conventional exhaust pipe 21. The manifold boiler 16 should also be insulated to prevent heat loss. The exhaust boiler 16 is so constructed that the preheated vapor travels from the cooler to the hotter end of the boiler. Alternatively, the boiler 16 and the exhaust manifold 19 could be included within the insulated jacket 12 of the engine. However, it is less expensive to construct the boiler on the outside of the engine. Several of these boilers could be installed in series with the vapor first passing through the last boiler through which exhaust gases pass with the final superheating occurring in the first boiler attached to the exhaust manifold 19. In this way more of the heat in the exhaust gas is converted into usuable vapor.

The superheated vapor is then conducted from the boiler tubing 18 via a line 22 to the steam chest 23 of the Rankine cycle section. The vapor supply to the Rankine cycle section can be shut off or the amount regulated by a regulator valve 10 located along line 22. The vapor operates two steam pistons 24, 25 in a conventional manner. Poppet valves 27, 28, 29 and 30 direct vapor into the top of the cylinder for the downstroke and into the bottom of the cylinder for the upstroke. These poppet valves 27, 28, 29, 30 open at the beginning of each stroke and allow the vapor to enter into the appropriate steam cylinder where it expands and does work. The vapor exits through a port in the cylinder wall (not shown) which is uncovered by the piston at the end of its stroke. The exhaust vapor is then channeled into a common exhaust duct (not shown) within the Rankine cycle section.

The pistons in both engine sections can be connected to the same crank shaft if the internal combustion section is operated in a low revolution per minute range as is feasible with some diesel engines. If the internal combustion section operates at a higher speed as in the case of gasoline powered engines, the two sections can be arranged in-line and connected by a planetary gear or a fluid coupling arrangement. The fluid coupling arrangement could be of a torque converter type which would match the slower speed of the Rankine cycle section to the internal combustion section.

The exhaust vapor from the exhaust duct exits by the return tube 31 for cooling. It is preferred that the vapor be conducted to an economizer 32 where fluid from the feed water pump 36 passes. The fluid in the feed water line 33 is thus preheated before entering the boiler tubing 11. The exhausted vapor from the economizer then passes into a small vapor motor 34 which drives a cooling fan 35 and feed water pump 36 by a belt 37 and pulleys 38, 39, 40. Fan 35 and feedwater pump 36 can also be so arranged that a clutch would connect them with a power drive in the internal combustion section at any time the vapor exhaust was insufficient to drive vapor motor 34. The vapor is then conducted through a line 41 through the top of the condenser 42 where is is condensed to a fluid by passing air, with the fluid flowing into an accumulator tank 71 connected to the bottom of the condenser 42. Alternatively, the vapor can be returned from the economizer directly to the condenser 42 with the fan 35 and feed water pump 36 being powered directly by a clutch linkage to the internal combustion section in a conventional manner. After the working fluid is condensed in the condenser 42, it flows to the accumulator tank 71. It is then pumped through line 43 to the feed water pump 36 and on to the feed water tube 33 via line 72 and then through the economizer 32 and into boiler tubing 11.

In the event the compound engine is operated at full power for sustained periods of time, an auxiliary radiator can be used to maintain adequate cooling. The auxiliary radiator can be attached to the ducts within the block by hoses attached to the orifices covered by outlet plate 44 and inlet plate 45. In this case a solenoid valve would open to allow the coolant to pass from outlet 44 through a radiator and then return through inlet 45. A thermostat would be placed in outlet 44 so that no coolant would pass through the radiator until the maximum allowable temperature had been reached.

The engine speed can be controlled by regulator valve 10 and a conventional fuel control mechanism in the internal combustion section. These control devices can be mechanically linked or controlled by an electronic control module 20. The electronic control module can regulate the fuel throttle by electrical cable (not shown) and control regulator valve 10 through an electrical cable 73. This electronic module is connected to the throttle and will open and close regulator valve 10 in response to throttle settings and steam temperature. The electronic module can be programmed to utilize the Rankine cycle section of the engine as much as the vapor pressure and temperature will permit.

However, increased fuel efficiency can be obtained by including a mechanism to shut down one or more of the internal combustions cylinders in order to maintain an optimum temperature for Rankine cycle operation. While this can be accomplished by manual controls, it is preferable to do this automatically. In the preferred automatic mechanism, an electronic control module 20 will monitor engine temperatures and shut down part or all of the internal combustion cylinders when the engine temperature is at the maximum desired. The electronic control module 20 is connected by an electric line 46 to solenoid 47 which seals the exhaust valve 48 and intake valve 49 on a cylinder. The construction of the valve set up is shown in FIGS. 6, 7, and 8. The electronic control module 20 shuts down an internal combustion cylinder by actuating solenoid 47 which moves a rod 50 in a direction towards the end of the solenoid. The rod 50 is attached to a yoke 51 which in turn is attached to keyway disc 52 on the exhaust valve and to a keyway disc (not shown) on the intake valve assembly 53 by a linking pin 54. The disc is rotated until each slot 55 is in perpendicular alignment with one of the tabs 56 on a sleeve 57 resting on the pivot point on the rocker arm 58. FIG. 8 is an exploded view of the components of the valve shutdown mechanism. The bolt 59 passes through a hole 74 in the mounting bracket 64 and affixes the mechanism to the cylinder head 4. The sleeve 57 has a cap 75 with slots 76 corresponding to the tabs 56 on the sleeve 57. Stop ring 77 limits the downward travel of the pushrod when the engine is stopped. Washers 78 and 79 permit the keyway disc 52 to turn. Internal loading spring 80 maintains pushrod 60 seating. A washer 81 and bolt sleeve 82 keep the spring 80 properly centered. When each tab 56 is in perpendicular alignment with the corresponding slot 55, only the pushrod 60 moves up and down as there is no fulcrum point for the rocker arm 58 to pivot about. The valves are shown in the sealed position in FIG. 7 and in the normal operating position in FIG. 6. When the solonoid 47 is deactivated as shown in FIG. 6 a spring 61 around rod 50 moves the yoke 51, linking pin 54 and rotates the keyway disc 52 so that each slot 55 on the disc is not in perpendicular alignment with the corresponding tab 56 on the sleeve 57. The sleeve then serves as a fulcrum point for the rocker arm 58 so that the reciprocating motion of the pushrod 60 is translated to the valve 48. The valve 48 has a conventional valve spring 63. The sleeve 57 is attached to the rocker arm 58 so that it does not rotate about its axis. The solonoid is held in position by a mounting bracket 64. When the valves for a cylinder are sealed as shown in FIG. 7, they take in no air-fuel mixture and exhaust no gases. The trapped air acts as a spring in the cylinder and returns the energy of compression to the crankshaft as the air expands on the return stroke. The intake valve is controlled in the same manner as the exhaust valve and both valves are controlled by a single solenoid. Thus, the electronic module 20 can selectively shut down one or more of the internal combustion cylinders to control the engine temperature and to optimize fuel utilization. In a diesel engine the fuel injectors for the cylinders must be deactivated at the same time the cylinder valves are sealed. The electronic module can also be programmed to shut down the entire internal combustion section if the temperature of that section becomes excessive as would occur in automobile engine when in heavy traffic. When enough vapor is used by the vapor engine section, part or all of the internal combustion cylinders will cut back into use.

Figure 2:
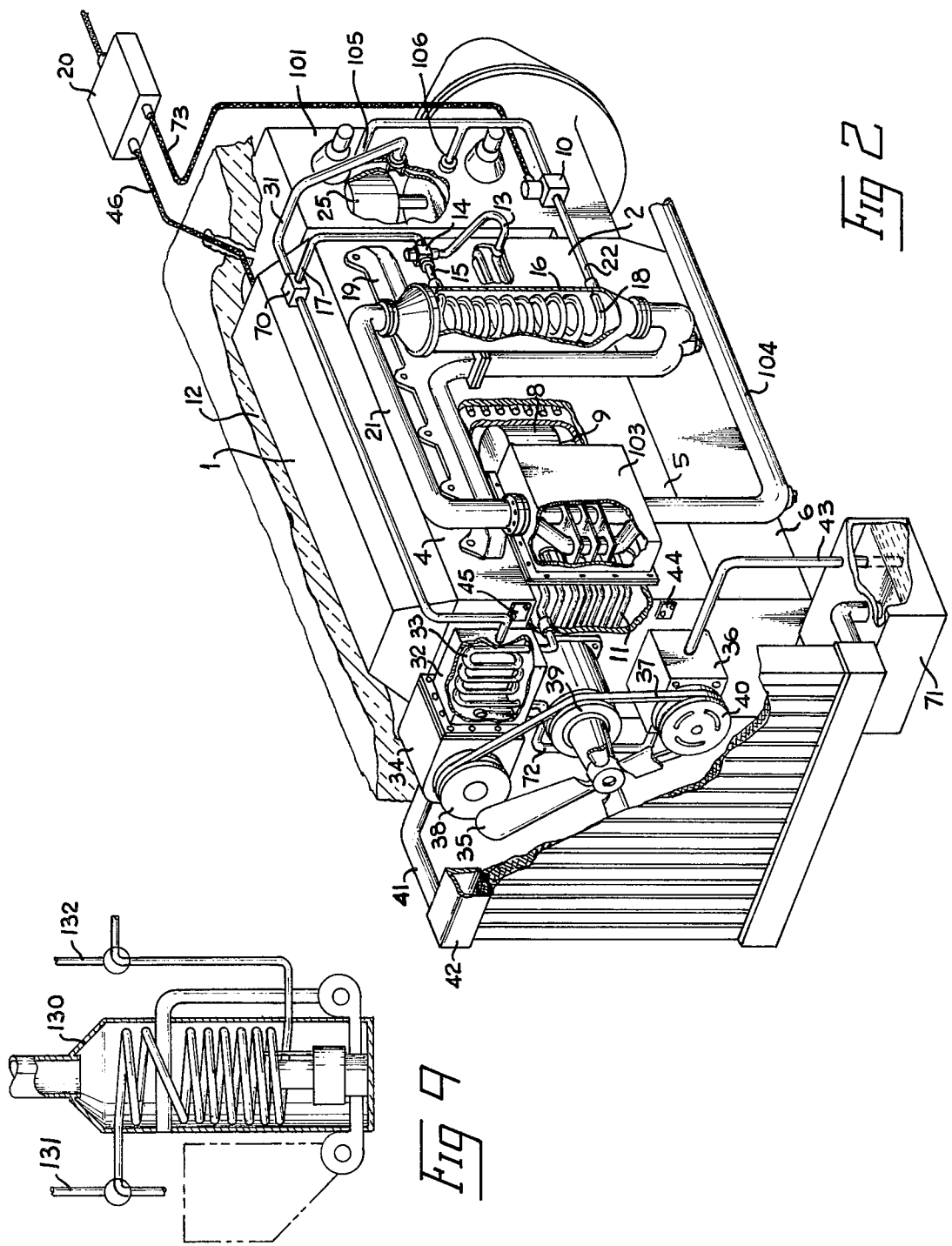
FIG. 2 is a perspective view of the side of a combination internal combustion and one cylinder Rankine cycle.

FIG. 2 discloses a combination engine with a diesel powered reciprocating internal combustion section 2 and a one cylinder Rankine cycle section 101. The internal combustion section of this engine including the cooling system operates in the manner described above for FIG. 1. The exhaust gas after passing through the exhaust manifold boiler 16 is conducted by an exhaust pipe 21 to a heat exchanger 103 attached to the side of the engine block 2 adjacent to the boiler tubing 11. The exhaust gas transfers some of its remaining heat back to the transfer fluid in the block and then into the working fluid in the boiler tubing 11, aiding in its conversion to vapor. In this manner, the vapor to the vapor engine can be superheated only 50° F. to 100° F. and the bulk of the exhaust heat can be returned to the engine block preheater-boiler. The exhaust gas is then vented to the atmosphere by a conventional exhaust pipe 104.

The Rankine cycle engine section 101 is operated by superheated vapor conveyed from the boiler 16 by tube 22 which is connected to both a top port 105 and bottom port 106 of the Rankine cycle engine.

Figure 3:
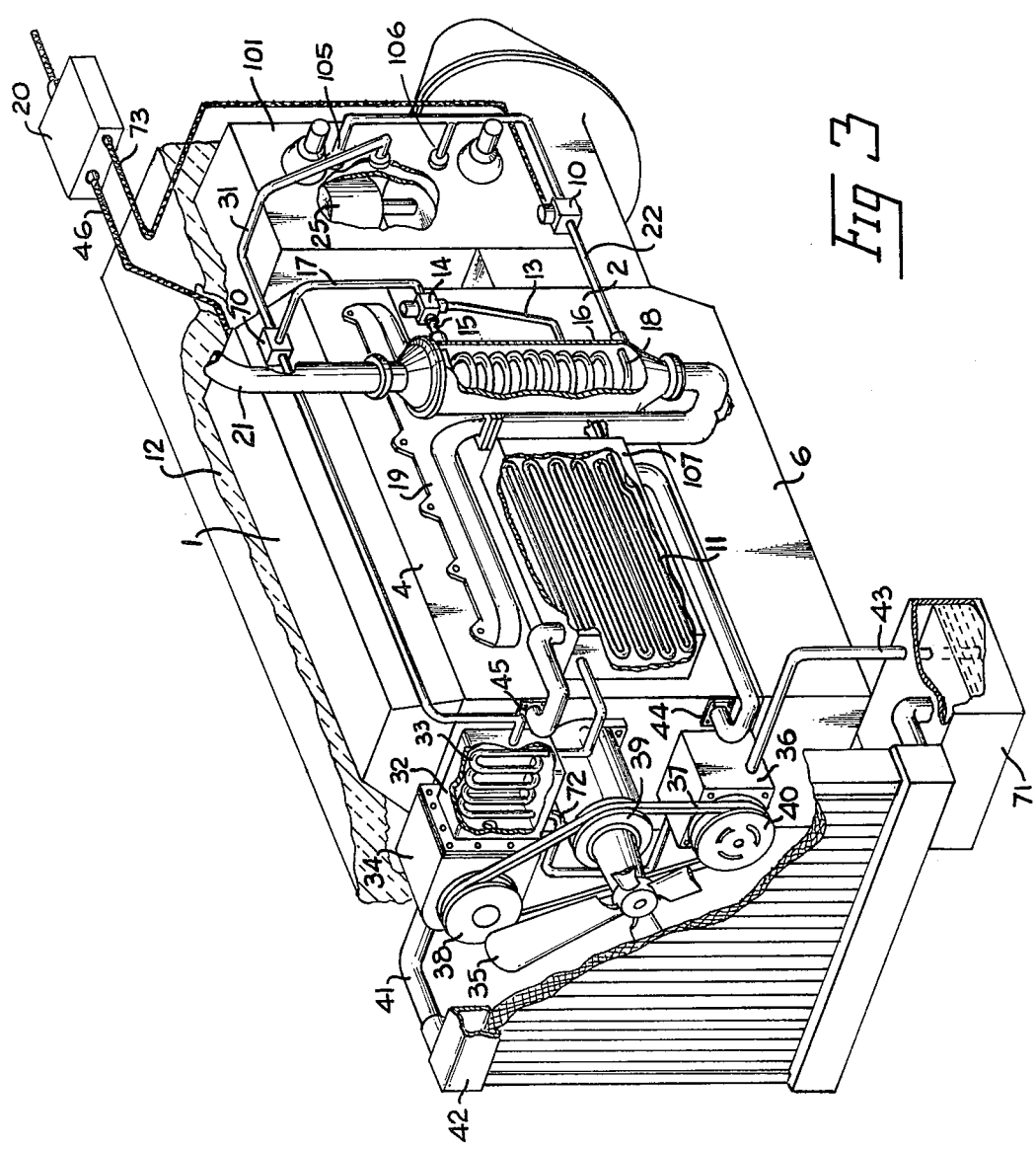
FIG. 3 is a side view of a combination reciprocating internal combustion and one cylinder steam engine in which a transfer fluid is used to transfer heat from the engine block to a coolant in boiler tubes in an external perheater boiler on the outside of the engine block.

FIG. 3 is a combination diesel powered reciprocating internal combustion engine and one cylinder Rankine cycle engine similar to the engine described in FIG. 1. The only difference being that the boiler lines 11 in FIG. 3 runs through an external preheater boiler 107 containing a transfer fluid for transferring the heat from the cylinders to the working fluid in the boiler tubing 11. The preheater boiler 107 is integrally connected to the cooling ducts of the internal combustion section. A water pump (not shown) sends the transfer fluid from ports in the engine block through the preheater boiler 107. In this manner, all components of a Rankine cycle engine section can be added to any existing internal combustion engine.

Figure 4:
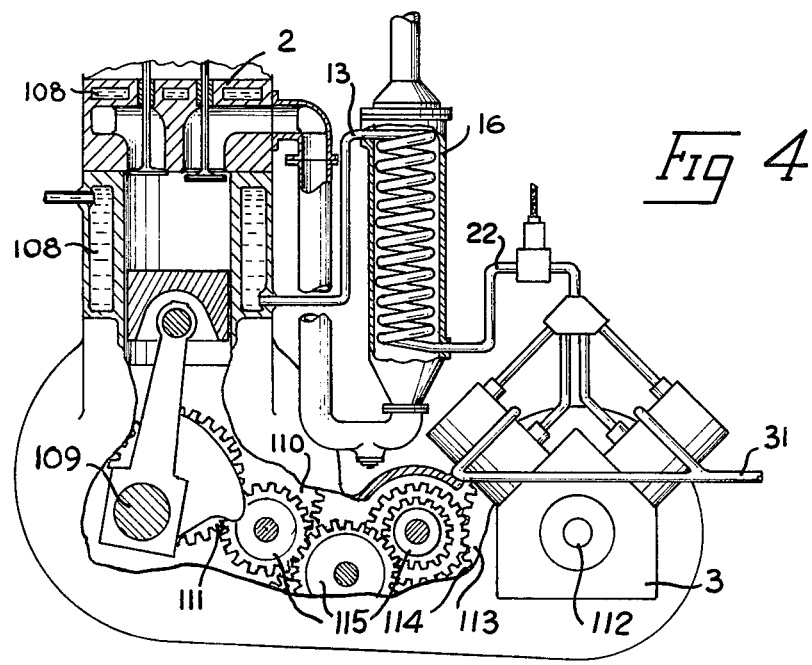
FIG. 4 is a cross section of a combination engine with a reciprocating internal combustion section and Rankine cycle section arranged in a side by side configuration and in which the transfer fluid in the internal combustion section is used as the working fluid for the Rankine cycle section.

FIG. 4 shows a combination engine with a reciprocating internal combustion section 2 and a Rankine cycle section 3 which are arranged in a side-by-side arrangement. In place of using boiler tubing, the transfer fluid is the coolant and is circulated through cavities 108 in the internal combustion section and then through an exit tube 13 to the exhaust manifold boiler 16 which operates in the same manner as the exhaust manifold boiler shown in FIG. 1. The vapor is then delivered by tube 22 to a steam engine 3 with its pistons arranged in a V configuration. After operating the pistons, the steam is recirculated by tube 31 to a condenser for condensing. The two sections of the engine are in direct gear connection. The crank shaft 109 of the internal combustion section is attached to a flywheel 110 and a gear 111 of smaller diameter than the flywheel. Similarly, the crank shaft 112 of the Rankine cycle engine is connected to a flywheel 113 with teeth 114 near its circumference. In some instances one flywheel would be sufficient for both sections. One or more step up gears 115 are used to correlate the speed of the two engine sections. The internal combustion engine is normally attached directly to the drive train of the vehicle. A fluid coupling can be provided for torsional isolation of the Rankine cycle section.

Figure 5:
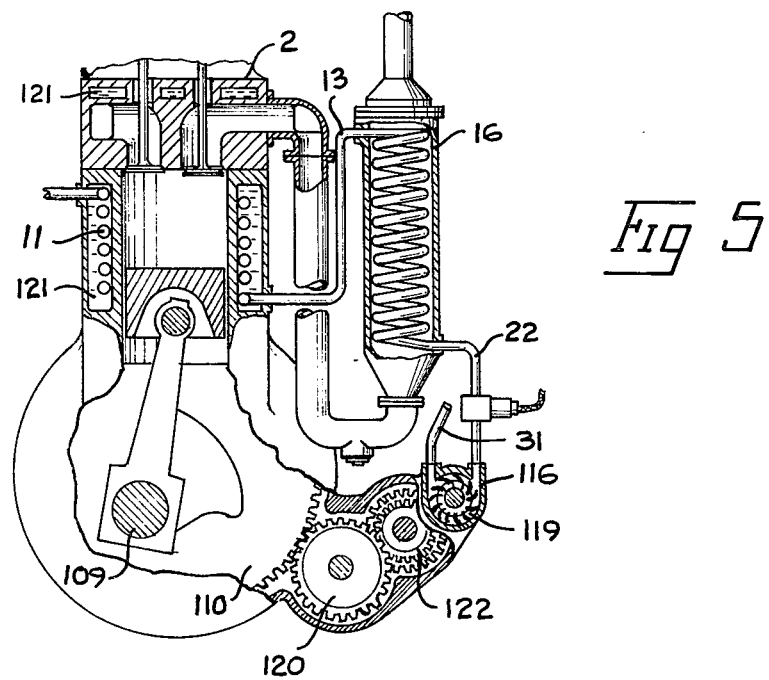
FIG. 5 is a cross section of a combination engine with a reciprocating internal combustion section and turbine section arranged in side by side configuration in which a transfer fluid transfers the heat to the coolant in the boiler tubing and in which the coolant is used as the working fluid for the turbine section.

FIG. 5 is a combination engine with a reciprocating internal combustion section 2 and a steam turbine section 116. The internal combustion section 2 has boiler tubing 11 adjacent the cylinders as shown in FIG. 1. Heat is transferred from the cylinder by transfer fluid 121 to the coolant working fluid in the boiler tubes 11. The boiler tubes are connected to the exhaust manifold boiler 16 in the same manner as shown in the earlier FIG. 1. The superheated steam leaves the exhaust manifold boiler by line 22 and drives turbine 119. The steam is then returned to the condenser by line 31. Reduction gears 120 and 122 reduce the rotational speed of the turbine so that it is correlated with the speed of the internal combustion section. A fluid coupling can be provided as needed for torsional isolation of the turbine. The designs shown in FIGS. 3, 4, and 5 could also be fitted with the exhaust heat economizer 103 as illustrated in FIG. 2 which extracts much of the remaining exhaust heat into the preheater boiler tubing 11 after it has left the boiler 16.

FIG. 9 is a conventional steam boiler 130 which can be attached to a combination engine in the event the internal combustion section becomes inoperable for any reason, such as shortage of petroleum fuel, the boiler can be heated by any fuel such as powdered coal, alcohol, fish oil or charcoal. The intake line 131 to the boiler can be attached to the feed water line 33 of the steam engine section as shown in FIG. 1 and the outlet line 132 can be attached to the steam chest in lieu of tube 22. In this way the internal combustion section of the engine is not operated and the compound engine only operates as a steam engine. A clutch can be provided to disengage the internal combustion section completely.

The internal combustion engine can be diesel or gasoline powered. This invention can also be used with a rotary engine commonly known as the Wankel engine and the Stirling engine.

The combination engine of this invention transfers the heat generated by the internal combustion engine section to a coolant which is converted to a vapor and powers the vapor engine section. This combination engine uses less fuel per unit of kinetic energy developed because much of the heat generated is used by the vapor engine section rather than being dissipated into the atmosphere by radiation from the engine and the radiator and through the exhaust.

The combination engine can be regulated so that the vapor engine section is used to produce as much of the power needed as is possible. This not only is more fuel efficient but also regulates the temperature of the internal combustion engine section. In all of these designs, the internal combustion exhaust can be further compounded to drive a turbo charger in order to supercharge the internal combustion cylinders.

If a single double acting cylinder vapor engine section is used, it will have two power strokes per revolution. This is the same number of power strokes as a four cylinder internal combustion engine. Conversely, two double acting vapor cylinders will have four power strokes per revolution, which is the same as a eight cylinder internal combustion engine.

What I claim:

1. A combination engine comprising:
   (a) a liquid-cooled internal combustion multi-cylinder reciprocating engine section, said section having an exhaust system for exhausting the gases produced during such combustion into the atmosphere, a vapor boiler located within the exhaust system so that the boiler is heated by the heat of the exhaust gases passing through, with the power produced by such section being transmitted to a drive train for said section, with means for converting at least one of the cylinders of the reciprocating engine from an operating to an inoperating condition and back to an operating condition;
   (b) a vapor-powered engine section, with the power produced by said vapor-powered engine section being transmitted to a drive train for said vapor-powered engine section;
   (c) a recycling circulatory system with means for circulating a liquid coolant through the internal combustion engine section to permit the transfer of heat produced by said internal combustion engine section to the liquid coolant in order to prevent the build-up of excessive temperatures during operation, then circulating the coolant into the vapor boiler in the exhaust system to permit the transfer of heat in the exhaust gas to the coolant resulting in the conversion of at least a portion of the coolant to a vapor, then circulating the vapor to the vapor powered engine section to power said vapor-powered engine section, then circulating the vapor to a condenser in which the vapor is cooled to a liquid which is circulated into the internal combustion engine section for recommencement of the cycle;
   (d) means for interconnecting the drive trains of the internal combustion engine section and the vapor powered engine section;
   (e) speed regulating means to control the speed of the combination engine and to apportion the portion of power produced by the vapor powered engine section by controlling the flow of vapor thereto and by the internal combustion engine section by controlling the fuel flow thereto.

2. The combination engine of claim 1 in which there are thermal insulating means to minimize the transfer to the atmosphere of the heat produced by the combination engine during operation.

3. The combination engine of claim 1 in which the exhaust system has an exhaust manifold through which the exhaust gases from the internal combustion engine section first pass, said manifold being connected to the vapor boiler through which the exhaust gases next pass, said manifold being connected to a heat exchanger located adjacent the means for circulating the liquid coolant through the internal combustion engine section so that the exhaust gases finally pass through the heat exchanger before being exhausted to the atmosphere so as to heat the liquid coolant prior to the circulation of the coolant through the vapor boiler.

4. The combination engine of claim 1 in which there are means for circulating a heat transfer fluid in the internal combustion engine section so as to transfer heat from said section to the liquid coolant being circulated through said section by circulating means.

5. The combination engine of claim 1 in which the vapor powered engine section is a steam turbine and in which the drive trains of the internal combustion engine section and vapor powered engine section are connected by reduction gears so that the rotation speed of the turbine is correlated with the speed of the internal combustion engine section.

6. The combination engine of claim 1 in which the multi-cylinder reciprocating engine section has ducts in the engine through which a transfer fluid is circulated, and tubing traversing at least a portion of the ducts, with the liquid coolant being circulated through said tubing so that heat is transferred from the engine to the transfer fluid and in turn to the liquid coolant.

* * * * *